United States Patent
Uchida et al.

(10) Patent No.: US 9,854,167 B2
(45) Date of Patent: Dec. 26, 2017

(54) SIGNAL PROCESSING DEVICE AND MOVING IMAGE CAPTURING DEVICE

(75) Inventors: Tomokazu Uchida, Kyoto (JP); Masahiro Hojo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 707 days.

(21) Appl. No.: 13/604,175

(22) Filed: Sep. 5, 2012

(65) Prior Publication Data
US 2012/0328008 A1 Dec. 27, 2012

Related U.S. Application Data

(63) Continuation of application No. PCT/JP2011/000487, filed on Jan. 28, 2011.

(30) Foreign Application Priority Data

Mar. 9, 2010 (JP) ................................. 2010-051562

(51) Int. Cl.
*H04N 7/26* (2006.01)
*H04N 5/232* (2006.01)
(Continued)

(52) U.S. Cl.
CPC ..... *H04N 5/23254* (2013.01); *H04N 5/23258* (2013.01); *H04N 19/103* (2014.11);
(Continued)

(58) Field of Classification Search
CPC .. H04B 7/32; H04B 1/66; H03M 7/36; H04N 7/26; H04N 19/176; H04N 19/196;
(Continued)

(56) References Cited

U.S. PATENT DOCUMENTS 5,253,054 A * 10/1993 Fujiwara ............. H04N 19/172
348/699
5,453,787 A * 9/1995 Hancock ............. H04N 11/042
375/240.01
(Continued)

FOREIGN PATENT DOCUMENTS

CN 1344112 A 4/2002
JP 10-066071 A 3/1998
(Continued)

OTHER PUBLICATIONS

"A High Definition H.264/AVC Intra-Frame CODEC IP for Digital Video and Still Camera Applications", Chun-Wei Ku et al., 1051-8215 © 2006 IEEE.*
(Continued)

*Primary Examiner* — Dramos I Kalapodas
(74) *Attorney, Agent, or Firm* — McDermott Will & Emery LLP

(57) ABSTRACT

A frame skipping process suited to a scene is achieved by providing an encoder which encodes input image data, an encoding determination unit which compares image movement information with a threshold to determine whether or not encoding is to be performed, a frame skipping controller which performs a frame skipping control if encoding is not to be performed, and a threshold correction unit which corrects the encoding determination threshold based on the result of the encoding process. The image movement information used in the encoding determination unit is any one or a combination of pixel movement information obtained by a representative point matching scheme performed by a pixel movement calculation unit, angular velocity sensor information obtained from a lens controller, and frequency information obtained from an image processor.

13 Claims, 17 Drawing Sheets

(51) Int. Cl.
*H04N 19/176* (2014.01)
*H04N 19/103* (2014.01)
*H04N 19/132* (2014.01)
*H04N 19/14* (2014.01)
*H04N 19/137* (2014.01)

(52) U.S. Cl.
CPC ......... *H04N 19/132* (2014.11); *H04N 19/137* (2014.11); *H04N 19/14* (2014.11); *H04N 19/176* (2014.11)

(58) Field of Classification Search
CPC .... H04N 19/136; H04N 19/132; H04N 19/61; H04N 19/172; H04N 19/14; H04N 19/154; H04N 19/137; H04N 19/42; H04N 19/423; H04N 19/115; H04N 19/15; H04N 19/51; H04N 19/46; H04N 19/00545; H04N 5/335; H04N 7/12; H04N 5/23254; H04N 19/103; H04N 5/23258; H04N 19/149; H04N 19/159; H04N 19/17; H04N 19/146; H04N 19/20; H04N 19/152; H04N 19/63; H04N 19/126; H04N 19/127; H04N 19/186; H04N 19/53; H04N 19/521; H04N 19/182; H04N 19/139; H04N 5/145; H04N 5/144; H04N 5/213; H04N 17/04; H04N 5/228; H04N 19/43; H04N 11/02–11/04; G06T 7/2013; G06T 2207/20016; G06T 2207/10016; G06T 2207/20032; G06T 2207/20012; G06T 5/002; G06T 7/2033; G06T 2207/20192; G06T 5/20; G06T 2207/20021; G06T 2207/30108; G06T 7/001; G06T 7/215; G09G 5/02

See application file for complete search history.

(56) References Cited

U.S. PATENT DOCUMENTS

| | | | | |
|---|---|---|---|---|
| 5,635,982 | A * | 6/1997 | Zhang | G06F 17/30802 348/231.99 |
| 6,385,245 | B1 * | 5/2002 | De Haan et al. | 375/240.16 |
| 6,591,014 | B1 * | 7/2003 | Ueda | H04N 19/197 375/E7.129 |
| 6,678,590 | B1 * | 1/2004 | Burchfiel | G05D 1/0253 348/116 |
| 6,680,738 | B1 * | 1/2004 | Ishii et al. | 345/568 |
| 6,931,063 | B2 * | 8/2005 | Sun | H04N 19/573 341/51 |
| 7,095,786 | B1 * | 8/2006 | Schonfeld | H04N 19/51 375/240.16 |
| 7,400,328 | B1 * | 7/2008 | Ye et al. | 345/537 |
| 7,643,554 | B2 * | 1/2010 | Watanabe | G06F 17/30811 375/240.08 |
| 7,689,321 | B2 * | 3/2010 | Karlsson | 700/253 |
| 8,374,246 | B2 * | 2/2013 | Raveendran | H04N 19/139 375/240.16 |
| 2001/0017887 | A1 * | 8/2001 | Furukawa | H04N 19/139 375/240.03 |
| 2002/0001345 | A1 * | 1/2002 | Yamada | G06T 9/007 375/240.07 |
| 2002/0181594 | A1 * | 12/2002 | Katsavounidis | H03M 7/30 375/240.24 |
| 2004/0234144 | A1 * | 11/2004 | Sugimoto | H04N 19/176 382/239 |
| 2005/0182518 | A1 * | 8/2005 | Karlsson | 700/253 |
| 2006/0127054 | A1 * | 6/2006 | Matsuyama | 386/96 |
| 2006/0171457 | A1 * | 8/2006 | DeGarrido | H04N 5/147 375/240.03 |
| 2006/0198443 | A1 * | 9/2006 | Liang | H04N 19/139 375/240.16 |
| 2006/0204113 | A1 * | 9/2006 | Wang | H04N 19/147 382/236 |
| 2006/0233253 | A1 * | 10/2006 | Shi | H04N 19/139 375/240.16 |
| 2007/0273750 | A1 * | 11/2007 | Tanaka | H04N 1/00307 348/14.01 |
| 2008/0089413 | A1 * | 4/2008 | Kishi | H04N 19/105 375/240.13 |
| 2008/0165861 | A1 * | 7/2008 | Wen | H04N 19/139 375/240.26 |
| 2009/0147853 | A1 * | 6/2009 | Dane | H04N 5/145 375/240.16 |
| 2009/0202164 | A1 * | 8/2009 | Rossato | H04N 19/105 382/238 |
| 2009/0268064 | A1 * | 10/2009 | Mizuno | H04N 5/208 348/252 |
| 2011/0110420 | A1 * | 5/2011 | Liang | H04N 19/119 375/240.03 |
| 2011/0176043 | A1 * | 7/2011 | Baker | G06T 5/003 348/296 |
| 2011/0292997 | A1 * | 12/2011 | An | H04N 19/521 375/240.03 |
| 2011/0298942 | A1 * | 12/2011 | Uchida | H04N 5/232 348/222.1 |
| 2012/0114040 | A1 * | 5/2012 | Shmueli | H04N 19/139 375/240.16 |
| 2013/0300751 | A1 * | 11/2013 | Teng | G06T 13/40 345/474 |

FOREIGN PATENT DOCUMENTS

| | | |
|---|---|---|
| JP | 2000-350211 A | 12/2000 |
| JP | 2001-036908 A | 2/2001 |
| JP | 2001-245303 A | 9/2001 |
| JP | 2008-035281 | 2/2008 |
| JP | 2008-532430 A | 8/2008 |
| JP | 2008-236789 A | 10/2008 |
| JP | 2009-201103 A | 9/2009 |
| JP | 2010-199656 A | 9/2010 |

OTHER PUBLICATIONS

English Translation of Chinese Search Report for Application No. 201180012475.7 dated Oct. 20, 2014.
International Search Report dated Mar. 22, 2011 issued in corresponding International Application No. PCT/JP2011/000487.

* cited by examiner

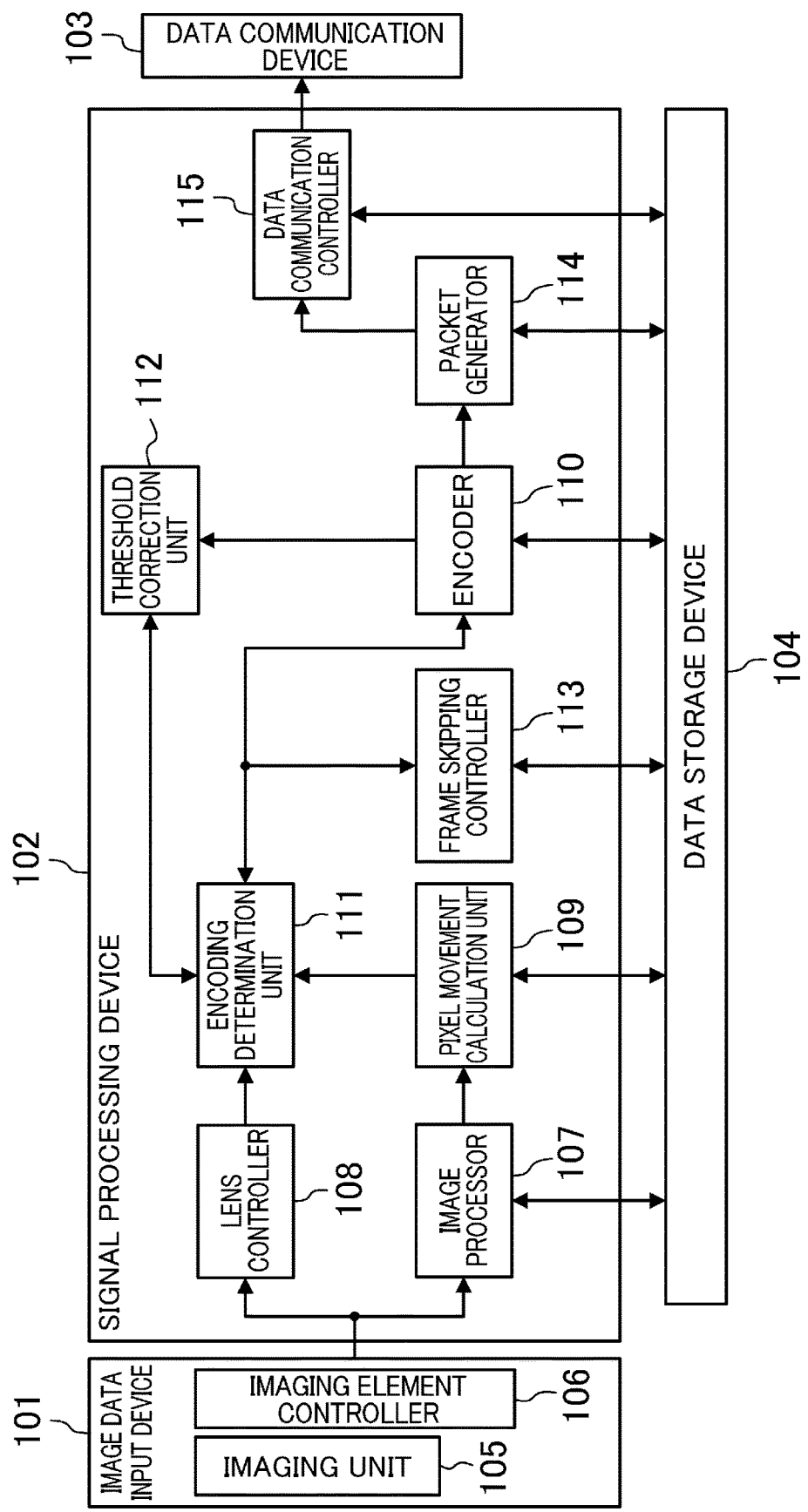

201

202   203

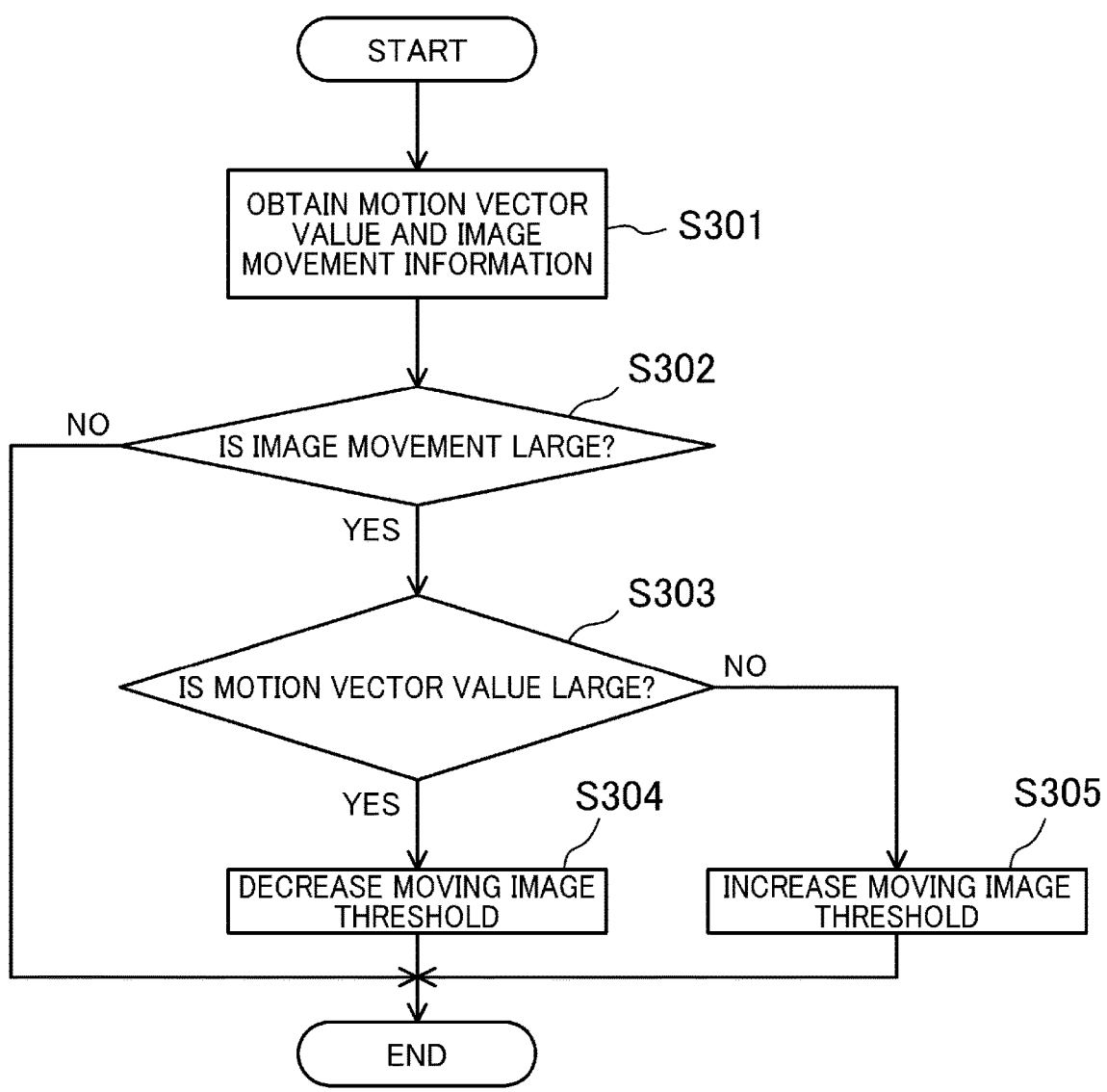

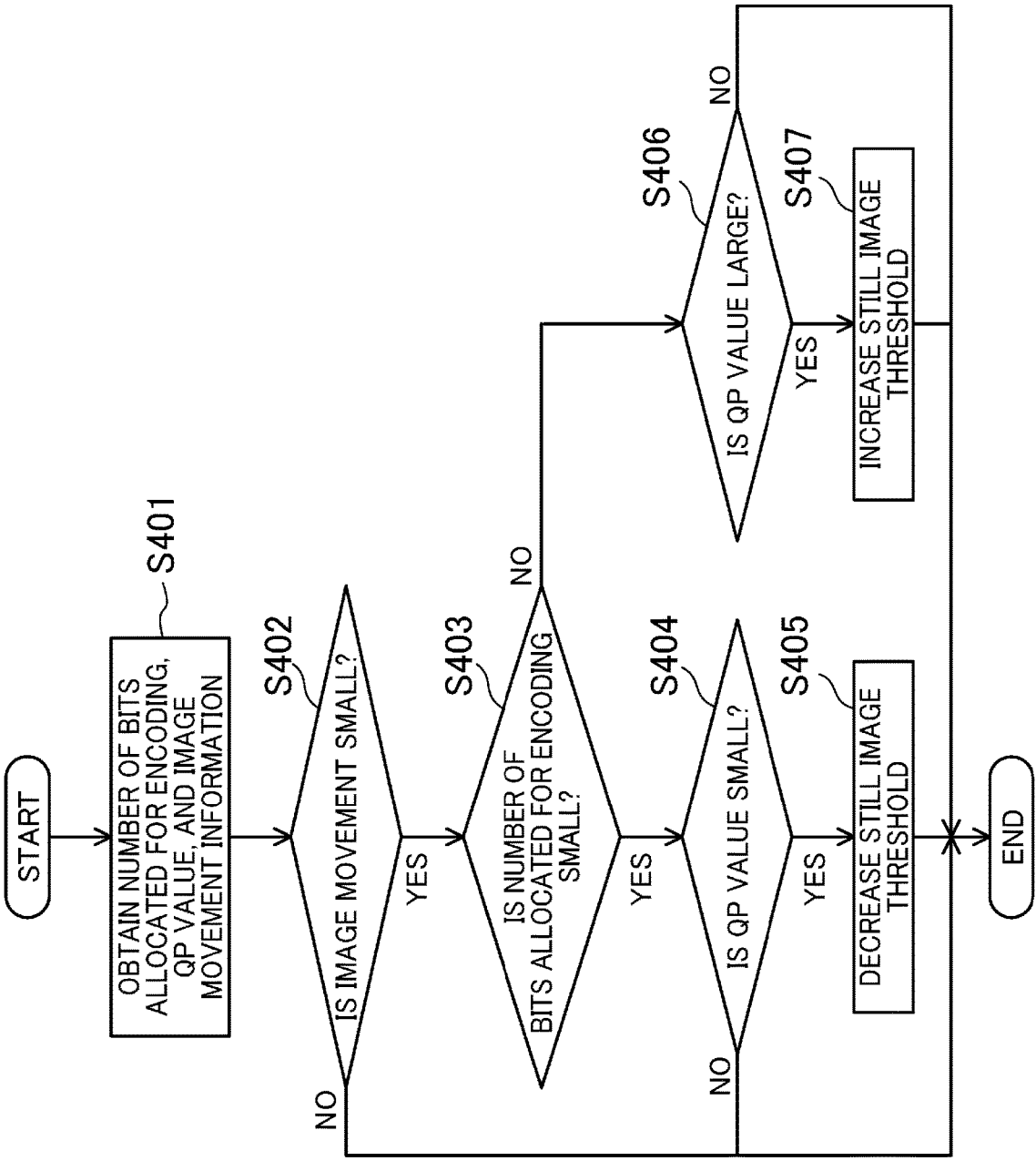

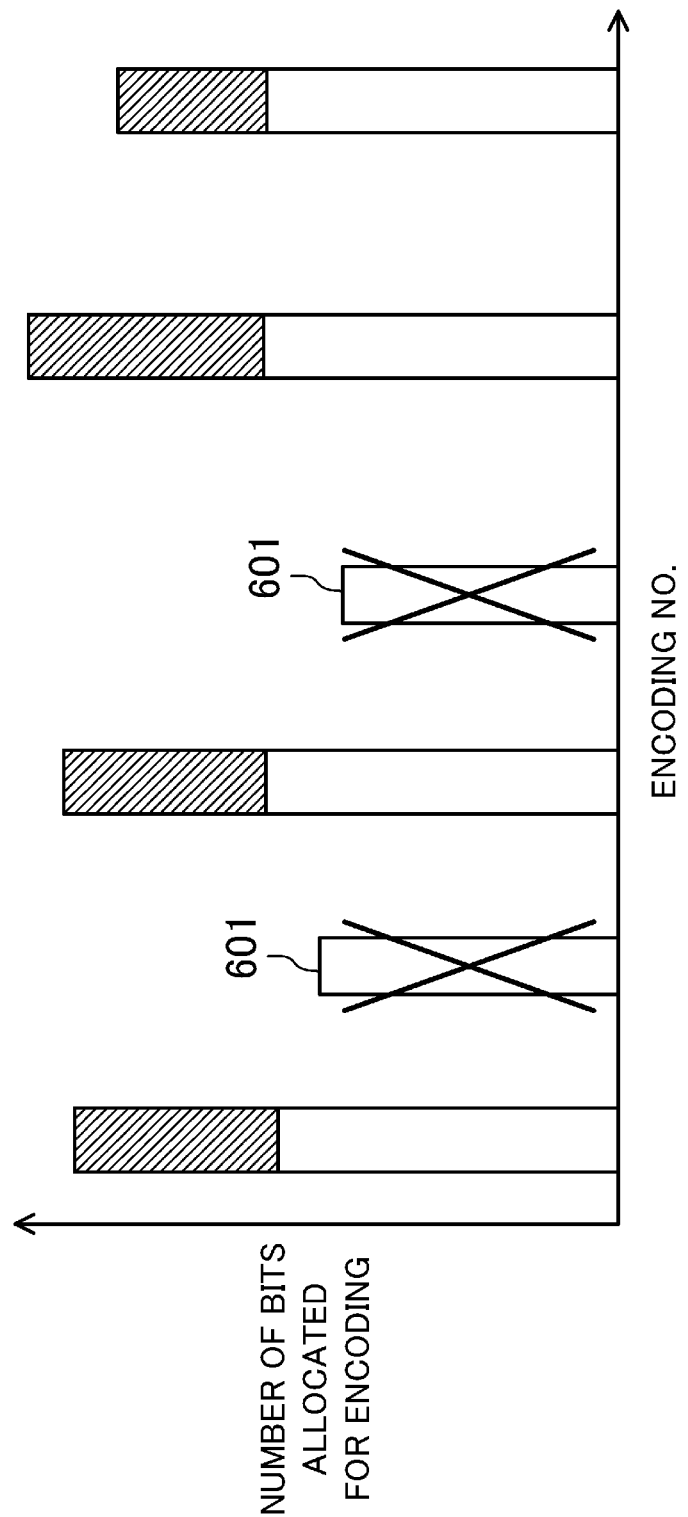

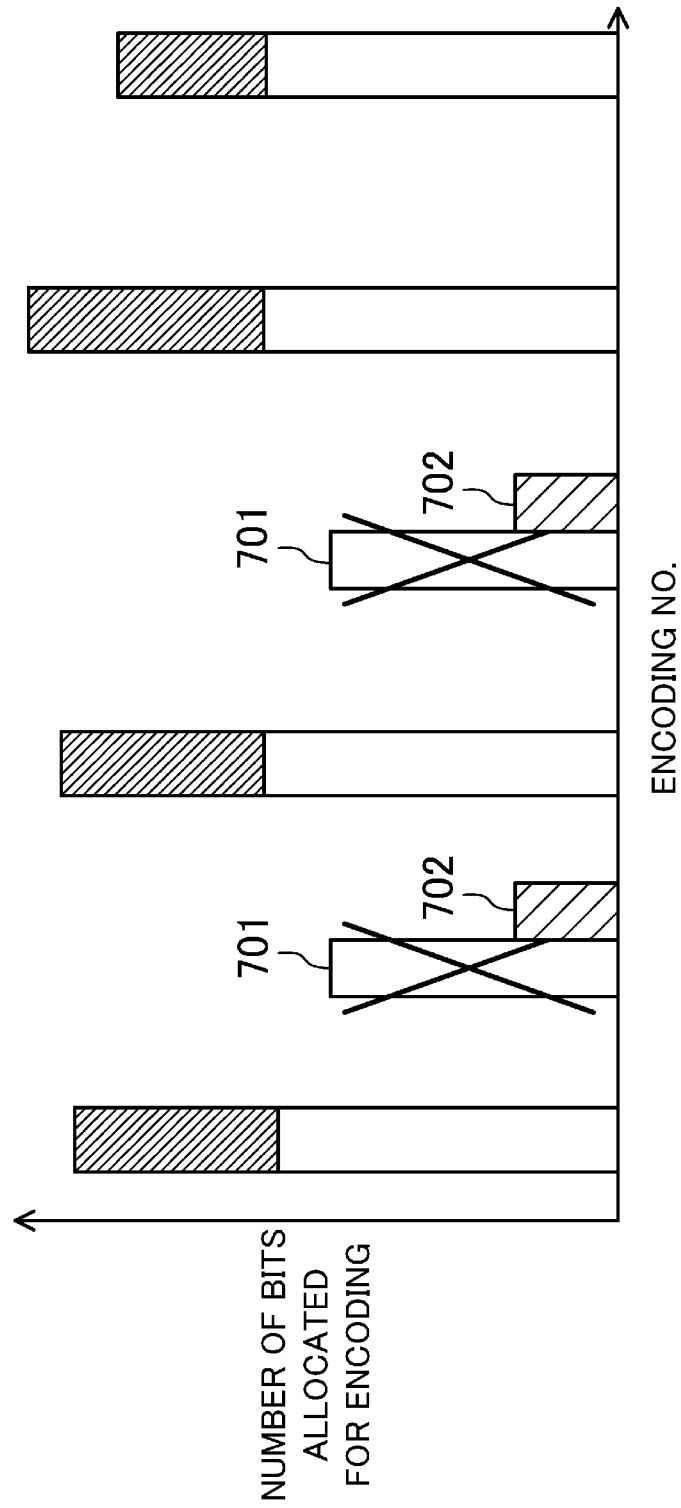

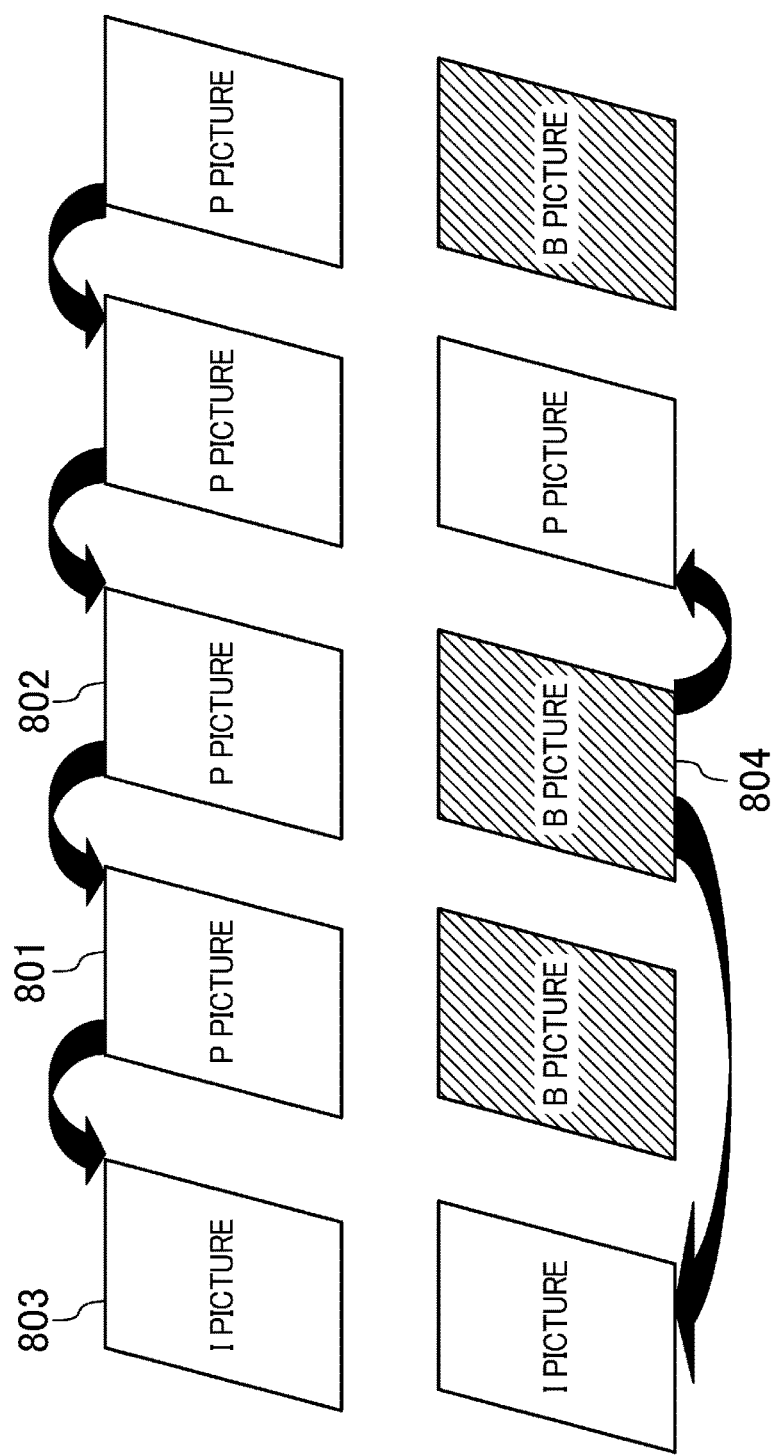

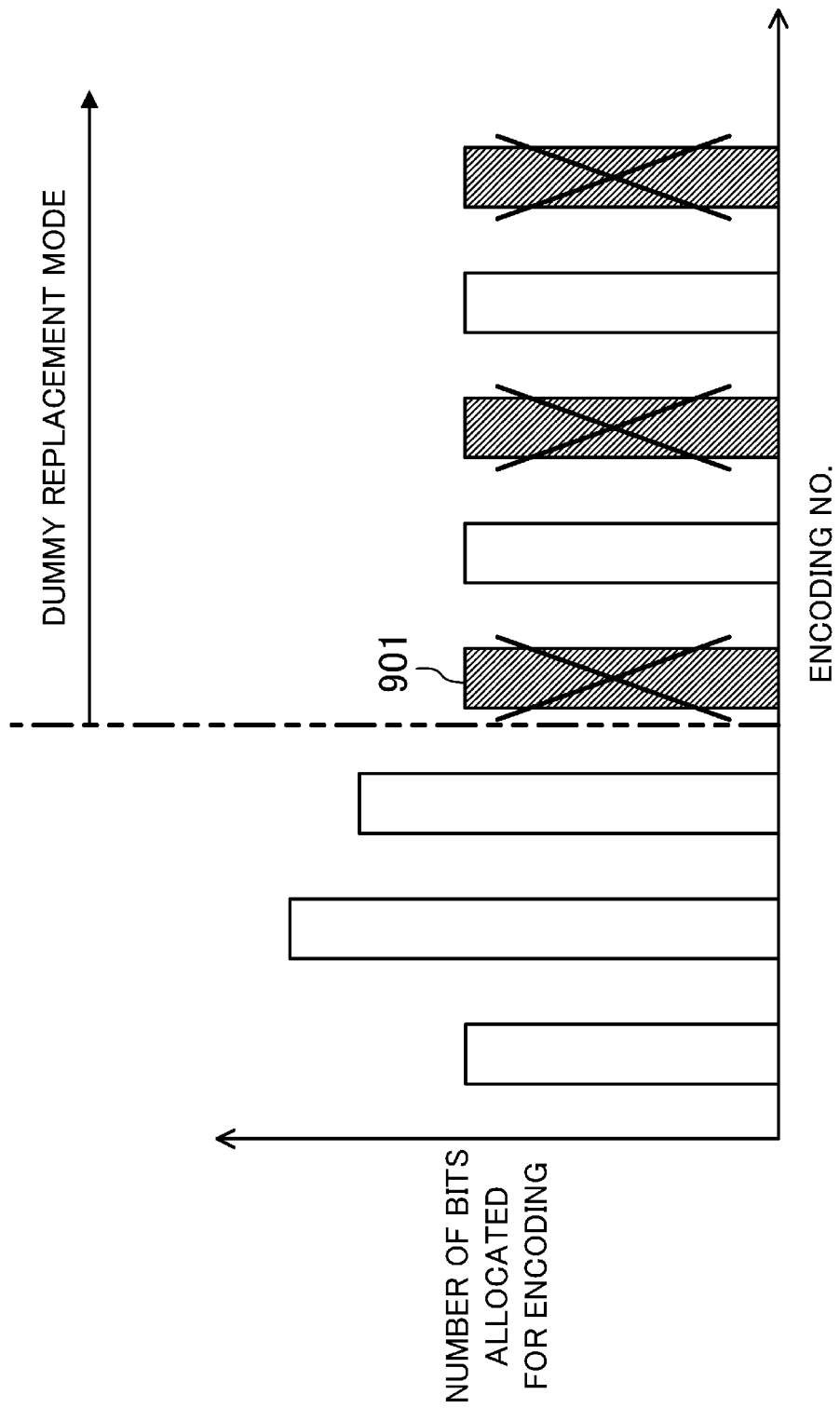

SIGNAL PROCESSING DEVICE AND MOVING IMAGE CAPTURING DEVICE

CROSS-REFERENCE TO RELATED APPLICATIONS

This is a continuation of PCT International Application PCT/JP2011/000487 filed on Jan. 28, 2011, which claims priority to Japanese Patent Application No. 2010-051562 filed on Mar. 9, 2010. The disclosures of these applications including the specifications, the drawings, and the claims are hereby incorporated by reference in their entirety.

BACKGROUND

The present disclosure relates to techniques of encoding moving images, and more particularly, to encoding techniques which are used when moving images are captured at a high resolution and a low bit rate. These techniques are used in products, such as network cameras, in-vehicle cameras, digital camcorders, etc.

In recent years, the resolution of the network camera has been increased. Despite the increase in resolution, the network camera still requires as low a target bit rate as it was before. Therefore, the number of bits allocated for encoding per frame remains as low as it was before in spite of the high resolution, disadvantageously resulting in a degradation in image quality.

In a conventional encoder, the frame rate is reduced based on a simple frame skipping algorithm in order to obtain a target bit rate. However, when the simple frame skipping is employed, decoded images are significantly unnatural in terms of visual quality.

There is a known technique of reducing or preventing the degradation in visual quality in which a difference between a frame image to be encoded and an image to be referenced during encoding, which is calculated on a pixel-by-pixel basis, and a frame which is determined to have a small difference is skipped. It is defined that "a pixel difference is small=a motion is small." Only frames having a small motion are skipped, whereby the number of bits allocated for encoding per frame is increased while unnaturalness in images is reduced (see Japanese Patent Publication No. 2008-236789).

When the pixel difference between the input frame and the reference frame is used to determine whether or not frame skipping is to be performed as described above, a small motion may cause a large pixel difference. In this case, frame skipping is not performed on frames having a small motion, and therefore, the number of bits allocated for encoding per frame decreases, resulting in a degradation in image quality. In particular, the tendency of this situation is significant if the input image contains a large amount of high-frequency components.

For moving images, the amount of a movement from the reference frame and the difference value of the remainder are encoded. Therefore, the pixel difference amount is not necessarily proportional to a code size after encoding. Therefore, even for a frame for which the number of bits allocated for encoding is small, if the pixel difference is large, it is determined that the frame is to be skipped, resulting in an unnatural image. In particular, the tendency of this situation is significant if the input image contains a large amount of high-frequency components.

In addition, the same algorithm is applied to any scenes to determine whether or not a frame is to be skipped, and therefore, the frame skipping process may not be suitable for some scenes.

If the above algorithm is used, frame skipping is applied only to scenes having a small motion. A scene having a large motion has a lower compression efficiency than that of a scene having a small motion, but has the same number of bits allocated for encoding per frame, and therefore, the degradation in image quality is not reduced.

SUMMARY

The present disclosure describes implementations of a signal processing device and a moving image capturing device which are capable of dynamically changing a threshold which is used to determine whether or not frame skipping is to be performed when a moving image is captured at a high resolution and a low bit rate.

An example signal processing device for compressing image data of a plurality of frames to generate a stream includes an encoder which encodes input image data, an encoding determination unit which compares image movement information with a threshold to determine whether or not encoding is to be performed, a frame skipping controller which performs a frame skipping control if encoding is not to be performed, and a threshold correction unit which corrects the encoding determination threshold based on the result of the encoding process.

The image movement information used in the encoding determination unit is any one or a combination of pixel movement information obtained by a representative point matching scheme performed by a pixel movement calculation unit, angular velocity sensor information obtained from a lens controller, and frequency information obtained from an image processor.

In the present disclosure, if the encoding determination process is performed using information (angular velocity sensor information or pixel movement information) which is conventionally used in a camera, there is only a small increase in the process of obtaining the image movement information. Also, the movement amount is used instead of the difference information, whereby the accuracy of motion detection can be improved.

In contrast to the conventional art, in which frame skipping is performed on all frames having a small motion, it can be determined that frame skipping is to be performed only on frames having a small motion and requiring a large number of bits allocated for encoding (low encoding efficiency). As a result, the skipping process is performed only on a required minimum number of frames, and therefore, not only the number of bits allocated for encoding per frame can be increased, but also a stream of natural images can be generated.

In addition, even when the encoding determination is performed on a scene having a large motion, it can be determined that frame skipping is to be performed only on frames having a low encoding efficiency because the threshold is corrected based on the encoding result. As a result, a stream of natural images can be generated while reducing a decrease in the frame rate to the extent possible.

BRIEF DESCRIPTION OF THE DRAWINGS

FIG. 1 is a block diagram of a moving image capturing device including a signal processing device according to the present disclosure.

FIG. 10 is a flowchart of a threshold correction algorithm employing a motion vector value in the threshold correction unit of FIG. 1.

FIG. 11 is a flowchart of a threshold correction algorithm employing the number of bits allocated for encoding and a quantization parameter value in the threshold correction unit of FIG. 1.

FIG. 12 is a diagram for describing operation of a frame skipping controller shown in FIG. 1.

FIG. 13 is a diagram for describing another operation of the frame skipping controller of FIG. 1.

FIGS. 14A and 14B are diagrams for describing frames for which the encoding determination unit of FIG. 1 determines that encoding is to be performed.

FIG. 16 is a diagram for describing a dummy frame mode in the encoding determination unit of FIG. 1.

DETAILED DESCRIPTION

Figure 2A:
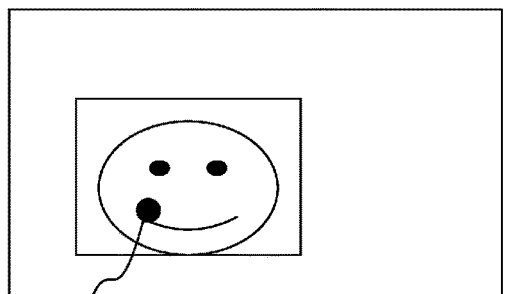
FIGS. 2A-2C are diagrams for describing a representative point matching algorithm in a pixel movement calculation unit shown in FIG. 1.

Embodiments of the present disclosure will be described hereinafter with reference to the accompanying drawings.

FIG. 1 shows a moving image capturing device which is, for example, a network camera which records moving images. The moving image capturing device includes an image data input device 101 which generates and outputs image data with a predetermined timing, a signal processing device 102 which performs image processing and encoding on the image data output from the image data input device 101, converts the resulting image data into packets to be transmitted through a network, and outputs the packets, a data communication device 103 which transmits the packets output from the signal processing device 102 to the network, and a data storage device 104 which temporarily stores data which is produced by each process.

The image data input device 101 includes an imaging unit 105 which converts light into an electrical signal, and an imaging element controller 106 which controls a timing with which the electrical signal output from the imaging unit 105 is received, and an irradiation time during which light is input to the imaging element.

The signal processing device 102 includes an image processor 107 which performs predetermined image processes (an automatic exposure (AE) process, a white balance (WB) process, an aperture process, a YC process, etc.) on a video signal read from the imaging unit 105 to convert the video signal into a luminance signal and a color difference signal, a lens controller 108 which controls a lens, a pixel movement calculation unit 109 which calculates a pixel movement amount, an encoder 110 which encodes input image data, an encoding determination unit 111 which determines whether or not encoding is to be performed by the encoder 110, based on image movement information and a threshold, a threshold correction unit 112 which corrects the threshold which is used in the encoding determination of the encoding determination unit 111, a frame skipping controller 113 which performs a frame skipping control when the encoding determination unit 111 determines that encoding is not to be performed, a packet generator 114 which divides the encoded data into packets for the network, and a data communication controller 115 which transfers the packets obtained by the packet generator 114 to the data communication device 103.

Figure 2B:
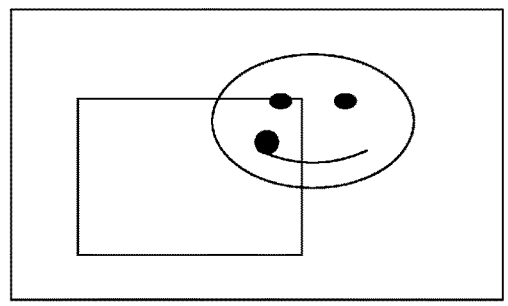
Figure 2C:
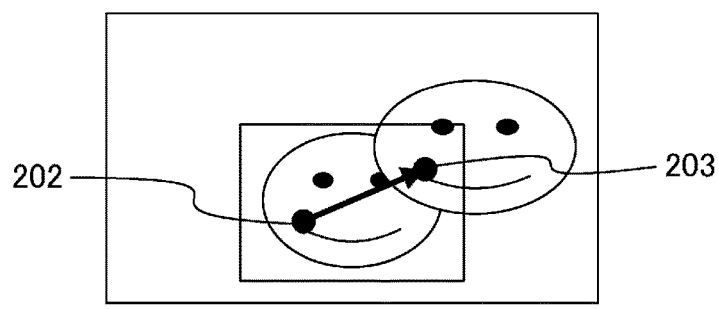

Here, a representative point matching algorithm for obtaining pixel movement information which is output as one item of image movement information from the pixel movement calculation unit 109 will be described with reference to FIGS. 2A-2C. In representative point matching, a representative point is determined in a block (sub-frame), and it is calculated how much that point is moved in the next frame. FIG. 2A is a diagram showing the first frame, in which a point 201 is a representative point. Information about the point 201 is held. FIG. 2B is a diagram showing the second frame, in which a point corresponding to the representative point is searched for and located. FIG. 2C is a diagram showing the first and second frames superimposed together. As can be seen from FIG. 2C, a representative point 202 defined in the first frame is moved to a point 203. The distance of this movement is referred to as a pixel movement amount. The pixel movement amount is herein used as one item of image movement information.

Figure 3:
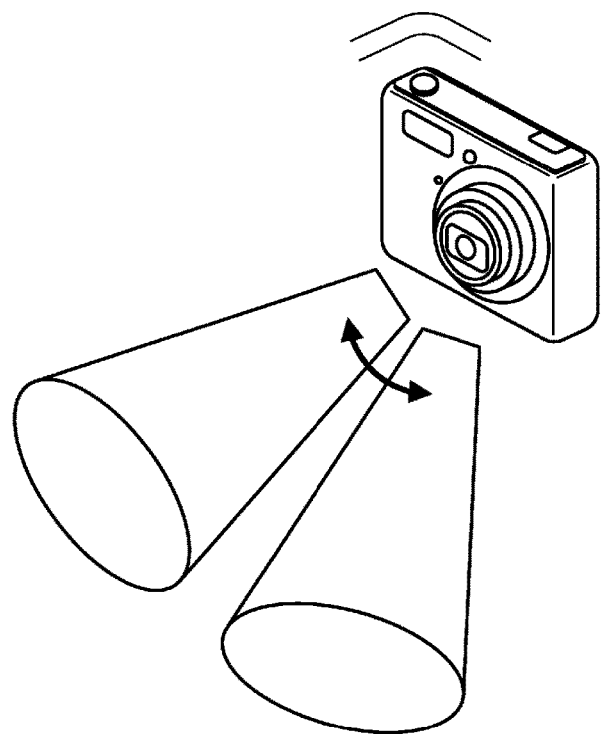
FIG. 3 is a diagram for describing angular velocity sensor information obtained from a lens controller shown in FIG. 1.

Next, angular velocity sensor information which is output from the lens controller 108 and used as one item of image movement information will be described with reference to FIG. 3. As shown in FIG. 3, the angular velocity sensor information indicates the amount of a motion of the camera. An angular velocity sensor provided in the sensor portion can be used to measure how much the camera is moved. The angular velocity sensor information is used as one item of image movement information.

The motion amount is calculated from the obtained angular velocity sensor information. The angular velocity sensor information (i.e., the motion amount) varies depending on whether or not zooming is performed. Even if the angular velocity sensor information indicates a small value, then when zooming is performed, the motion amount is large. Therefore, when the motion amount is calculated from the angular velocity sensor information, a value obtained by multiplying the angular velocity sensor information by the zoom magnification is used as the motion amount.

Figure 4:
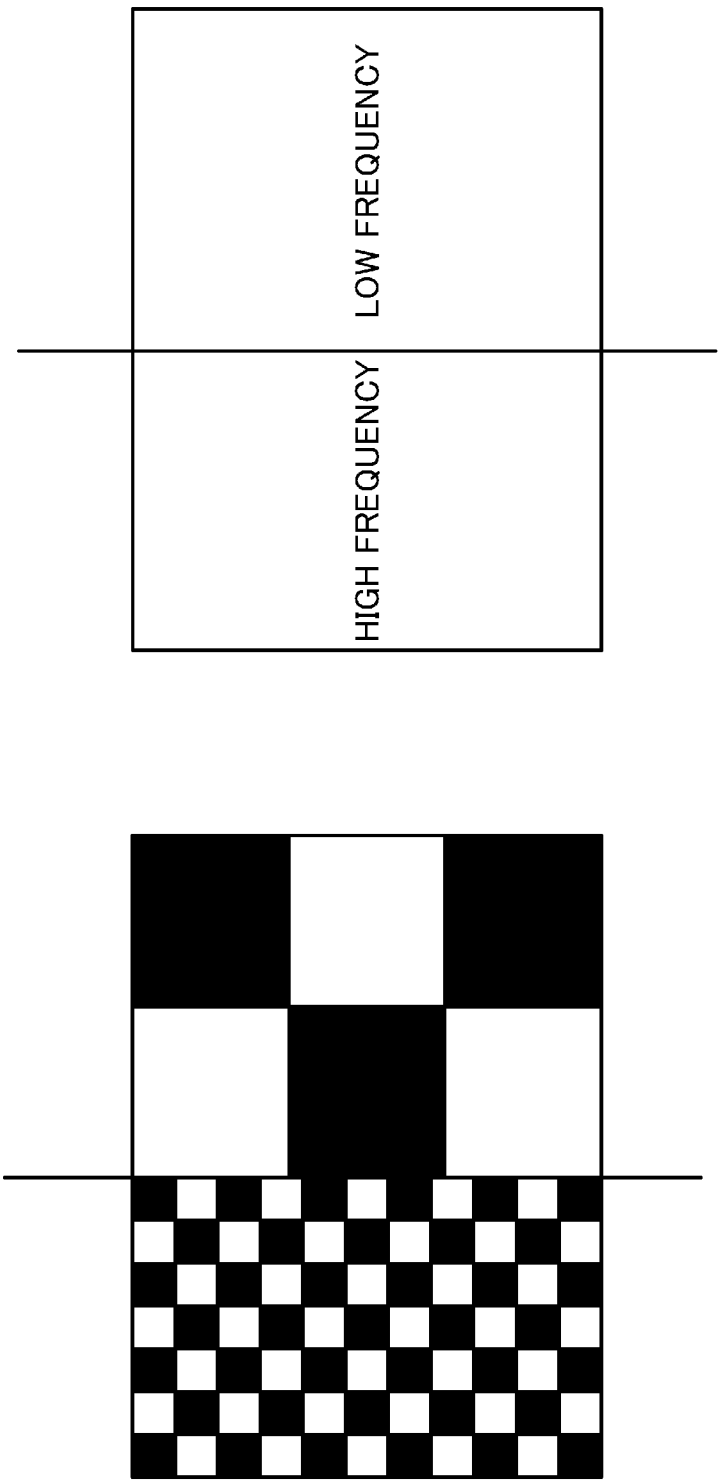
FIGS. 4A and 4B are diagrams for describing frequency information obtained from an image processor shown in FIG. 1.

When input data is processed by the image processor 107, frequency information such as those shown in FIGS. 4A and 4B is obtained as one item of image movement information. The image processor 107 can obtain frequency information of an entire image, and can also obtain frequency information of each portion of the screen, where the screen is divided into a plurality of portions. The encoding determination unit 111 performs the encoding determination process based on the image frequency information. For example, the encoding determination unit 111 calculates, for each region, a difference between the frequency information of image data to be encoded and the frequency information of an image to be referenced during encoding, and if the calculation result is small, determines that a movement is not present in the image, instructs the frame skipping controller 113 not to perform encoding.

If the pixel movement information, the angular velocity sensor information, and the frequency information are used in combination, the encoding determination control can be more accurately performed.

Figure 5:
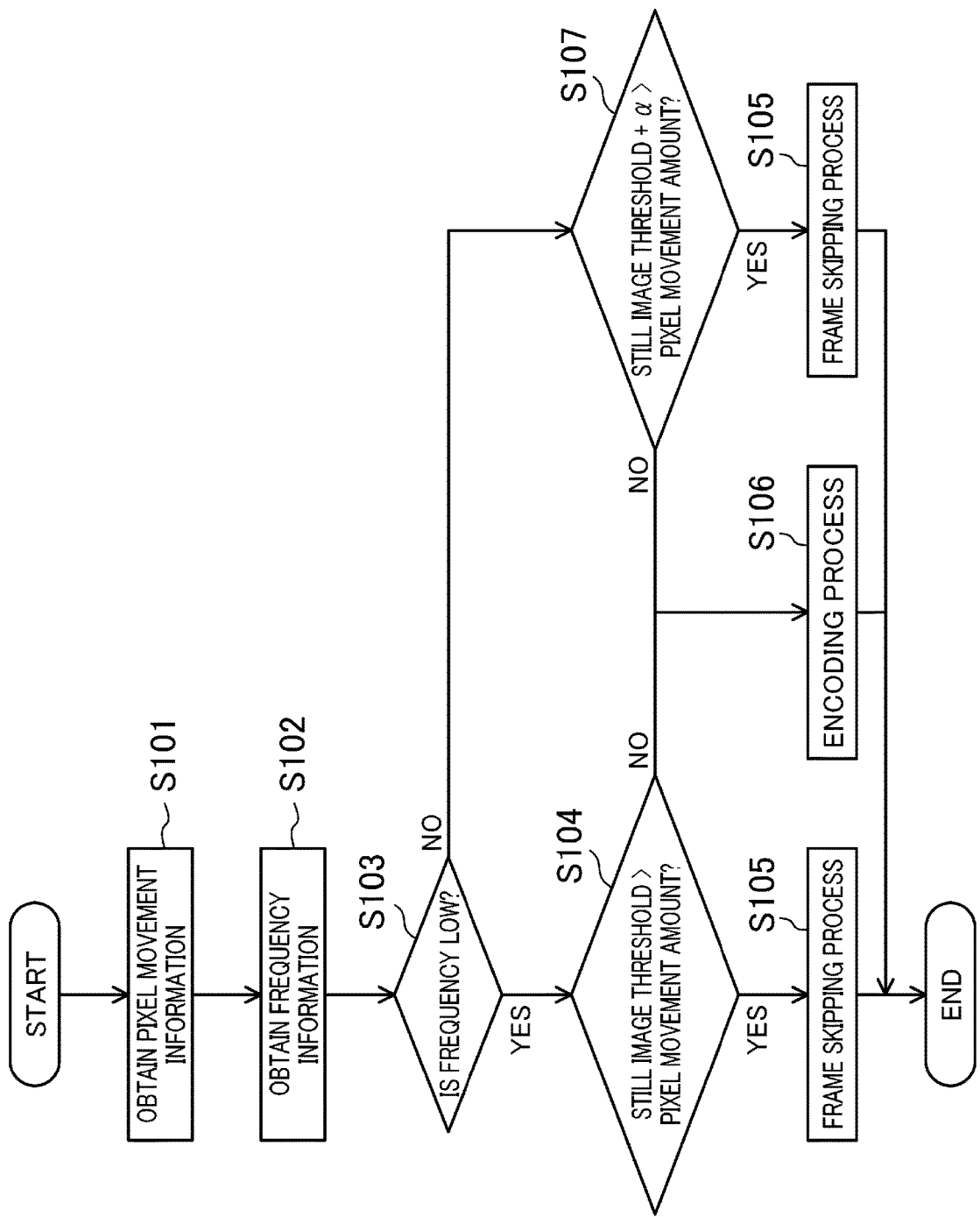
FIG. 5 is a flowchart showing example frame skipping operation in the signal processing device of FIG. 1.

FIG. 5 shows a still image skipping determination process algorithm employing the pixel movement information and the frequency information in combination. In S101, the pixel movement information is obtained from the pixel movement calculation unit 109. In S102, the frequency information of the entire image is obtained from the image processor 107. In S103, determination is performed based on the frequency information obtained from the image processor 107. If the frequency is determined to be low, in S104 the pixel movement amount is compared with a still image threshold as in the conventional art. If the pixel movement amount is smaller than the threshold, it is determined that encoding is not required, and the frame skipping controller 113 performs a frame skipping process S105. If the pixel movement amount is larger than the threshold, it is determined that encoding is required, and in S106 the encoder 110 performs an encoding process.

If it is determined in S103 that the frequency is high, in S107 the pixel movement information is compared with the threshold. In this case, because the image has high-frequency components, if the image is compressed, a large number of bits is output. Therefore, by increasing the threshold, the frame skipping determination is caused to be less strict. In this case, the number of bits allocated for encoding per frame can be maintained. If the pixel movement information is smaller than the threshold, it is determined that encoding is not required, and the frame skipping controller 113 performs the frame skipping process S105. If the pixel movement information is larger than the threshold, it is determined that encoding is required, and in S106 the encoder 110 performs an encoding process.

Figure 6:
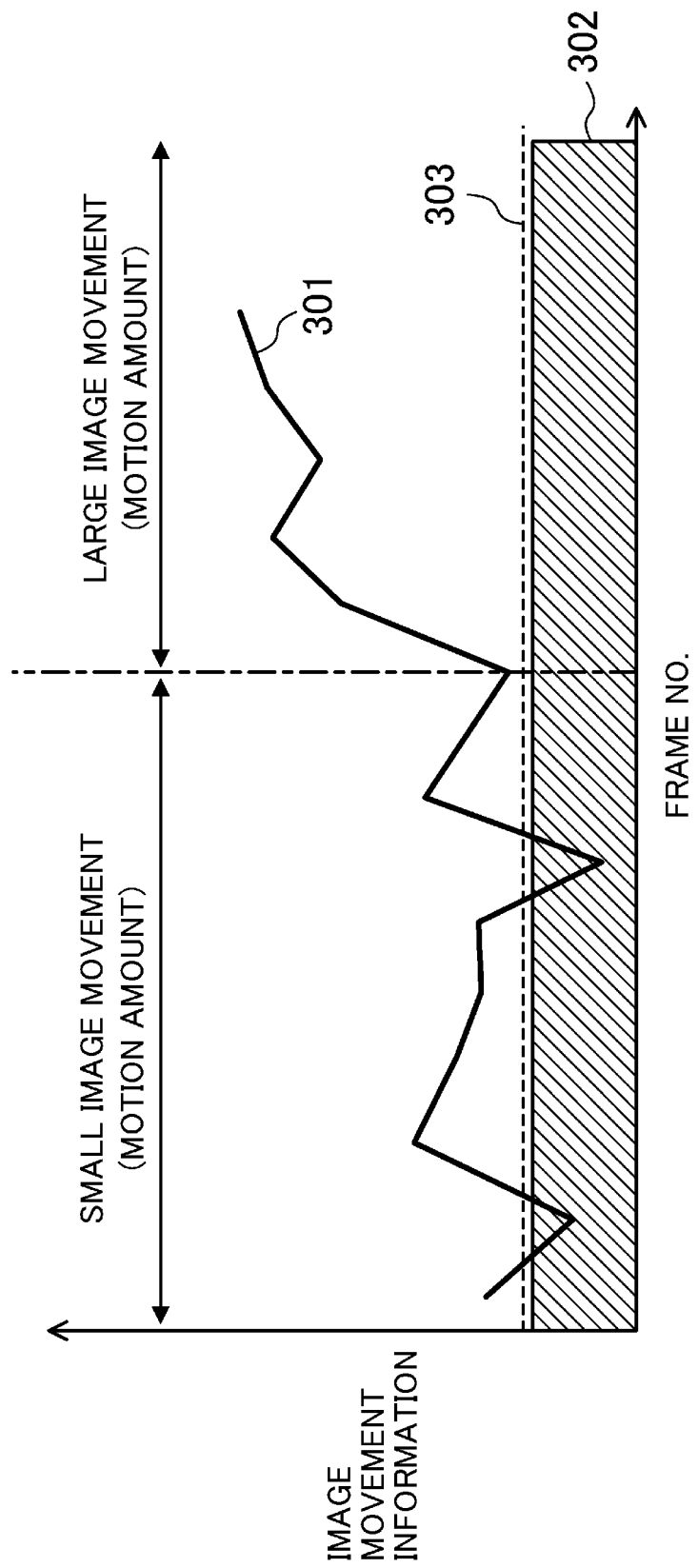
FIG. 6 is a diagram for describing a still image threshold in an encoding determination unit shown in FIG. 1.
Figure 7:
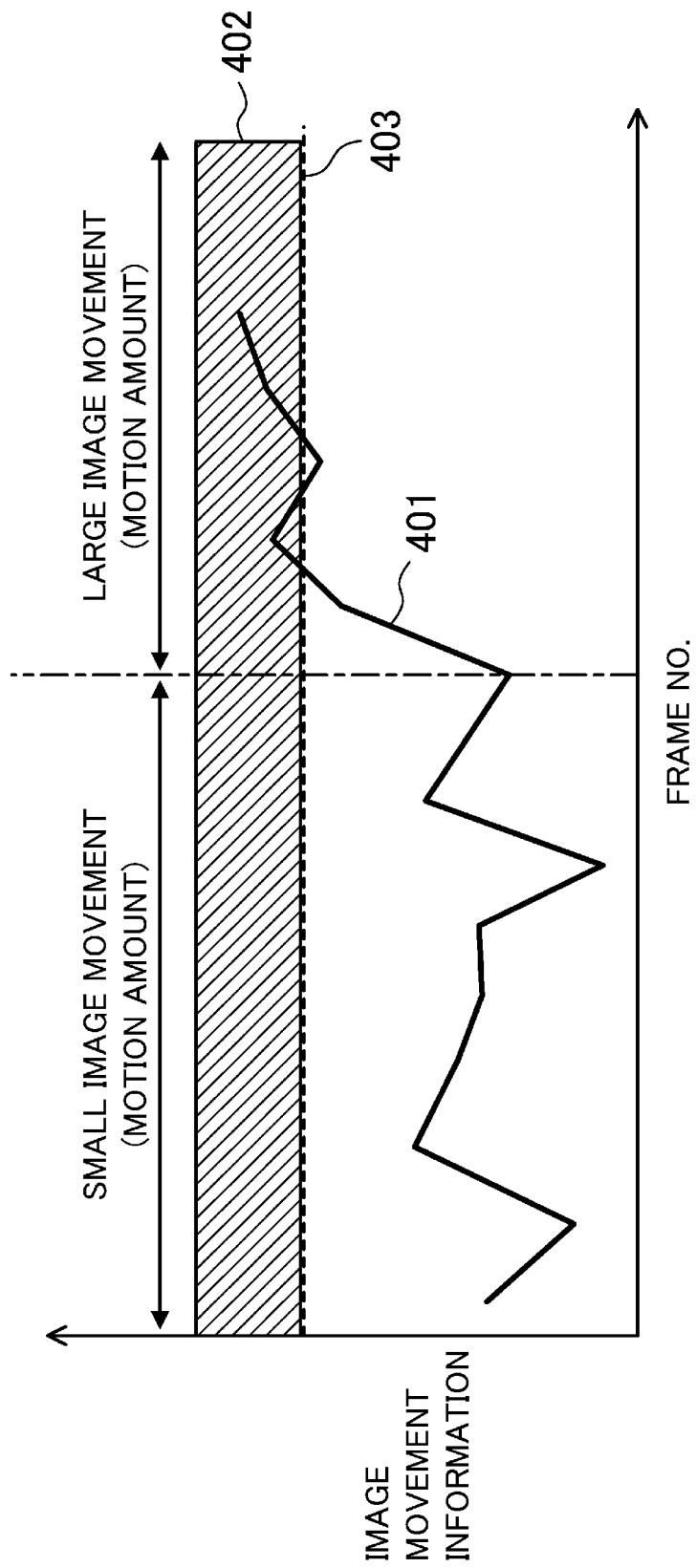
FIG. 7 is a diagram for describing a moving image threshold in the encoding determination unit of FIG. 1.
Figure 8:
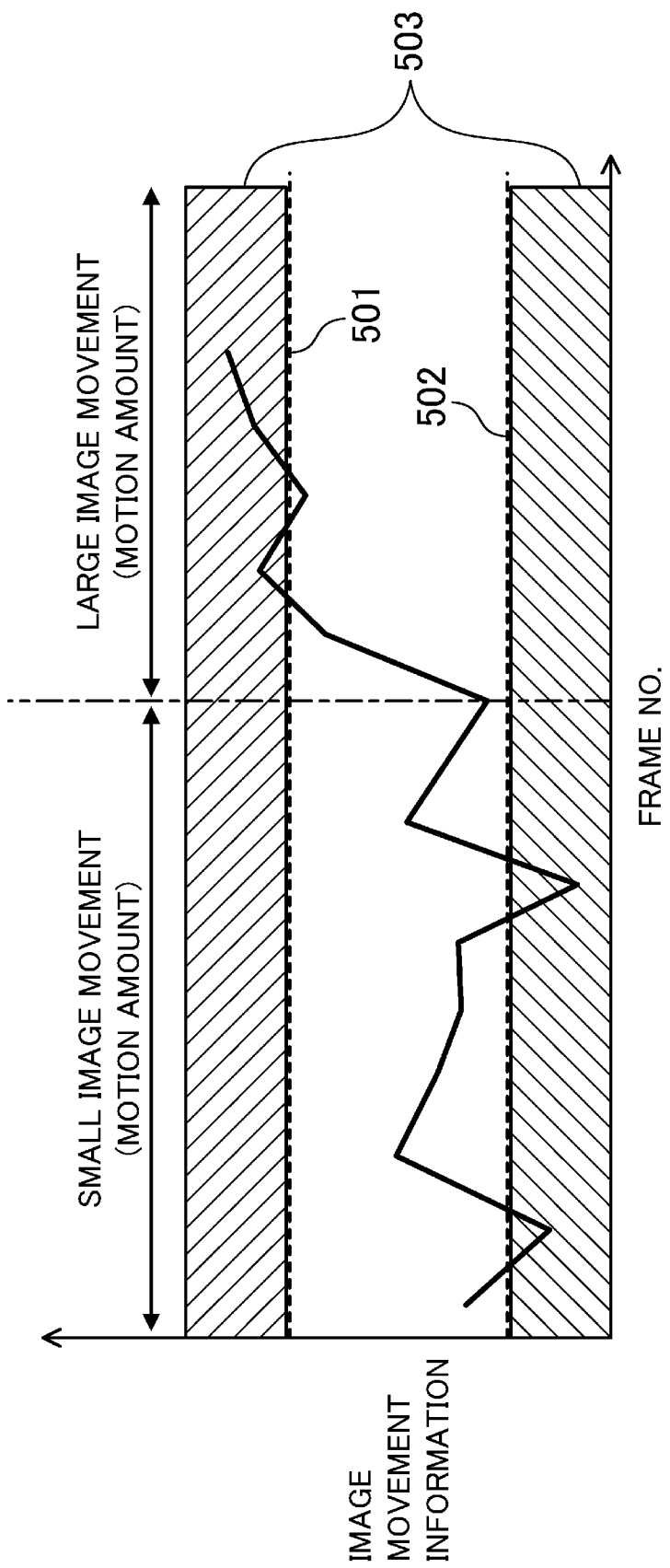
FIG. 8 is a diagram for describing a still image threshold and a moving image threshold in the encoding determination unit of FIG. 1.

Next, the encoding determination process of the encoding determination unit 111 will be described with reference to FIGS. 6-8.

Firstly, the skipping determination for a scene having a small motion will be described with reference to FIG. 6. A scene having a small motion has a feature that a change amount (difference) between each frame is small. When a moving image is captured, then even if a frame having a small change is skipped, substantially no unnatural image occurs. Therefore, by capitalizing on the feature that the change amount is small, the encoding determination unit 111 holds, as a still image threshold 303, a low threshold for determining a scene having a small motion. If the image movement information 301 is lower than the still image threshold 303 (the image movement information 301 falls in a region 302), it is determined that the frame is to be skipped.

Next, the skipping determination for a scene having a large motion will be described with reference to FIG. 7. A scene having a large motion has a feature that a change amount (difference) between each frame is large. A characteristic of the human visual system that the amount of information obtained from an image having a motion is small is also used. When a moving image is captured, then if a frame having a large motion is skipped, slight unnaturalness occurs in the image. However, the amount of information obtained per frame is smaller than that of a still frame, and therefore, the generated stream is not significantly affected. For streams, it is a more critical problem that a sufficient number of bits is not allocated and therefore the image quality is degraded. Therefore, by capitalizing on the feature that a scene having a large motion has a large change amount, the encoding determination unit 111 holds, as a moving image threshold 403, a high threshold for determining a scene having a large motion. If the image movement information 401 is higher than the moving image threshold 403 (the image movement information 401 falls in a region 402), it is determined that the frame is to be skipped.

The encoding determination unit 111 can perform a better frame skipping control by using the still image threshold and the moving image threshold in combination. This will be described with reference to FIG. 8.

The encoding determination unit 111 performs the encoding determination process using both a moving image threshold 501 and a still image threshold 502. In this case, an optimum frame skipping process can be performed even when scenes are changed during capturing of a moving image. A reference character 503 indicates a region in which it is determined that a frame is to be skipped.

When it is desirable to reduce frame skipping for moving scenes, the still image threshold 502 is increased so that the frame skipping determination is less strict for frames having a small motion, and the moving image threshold 501 is increased so that the frame skipping determination is stricter for frames having a large motion. As a result, frame skipping can be reduced for scenes having a large motion, without changing the number of bits allocated for encoding per frame.

Conversely, when it is desirable to reduce frame skipping for still scenes, the moving image threshold 501 is decreased so that the frame skipping determination is less strict for frames having a large motion, and the still image threshold 502 is decreased so that the frame skipping determination is stricter for frames having a small motion. As a result, frame skipping can be reduced for scenes having a small motion, without changing the number of bits allocated for encoding per frame.

Next, a control process performed by the threshold correction unit 112 will be described. There are various scenes, such as a scene in which a high-frequency portion occupies most of the screen, a scene in which a low-frequency portion occupies most of the screen, a scene having a small motion, a scene having a large motion, etc. Different threshold values are suitable for different scenes. When a moving image is captured, scenes are changed from moment to moment, and therefore, different threshold values need to be provided for the different scenes. Therefore, in the threshold correction unit 112, based on information indicating the encoding result, the threshold is corrected to be suitable for each of recorded scenes.

Figure 9:
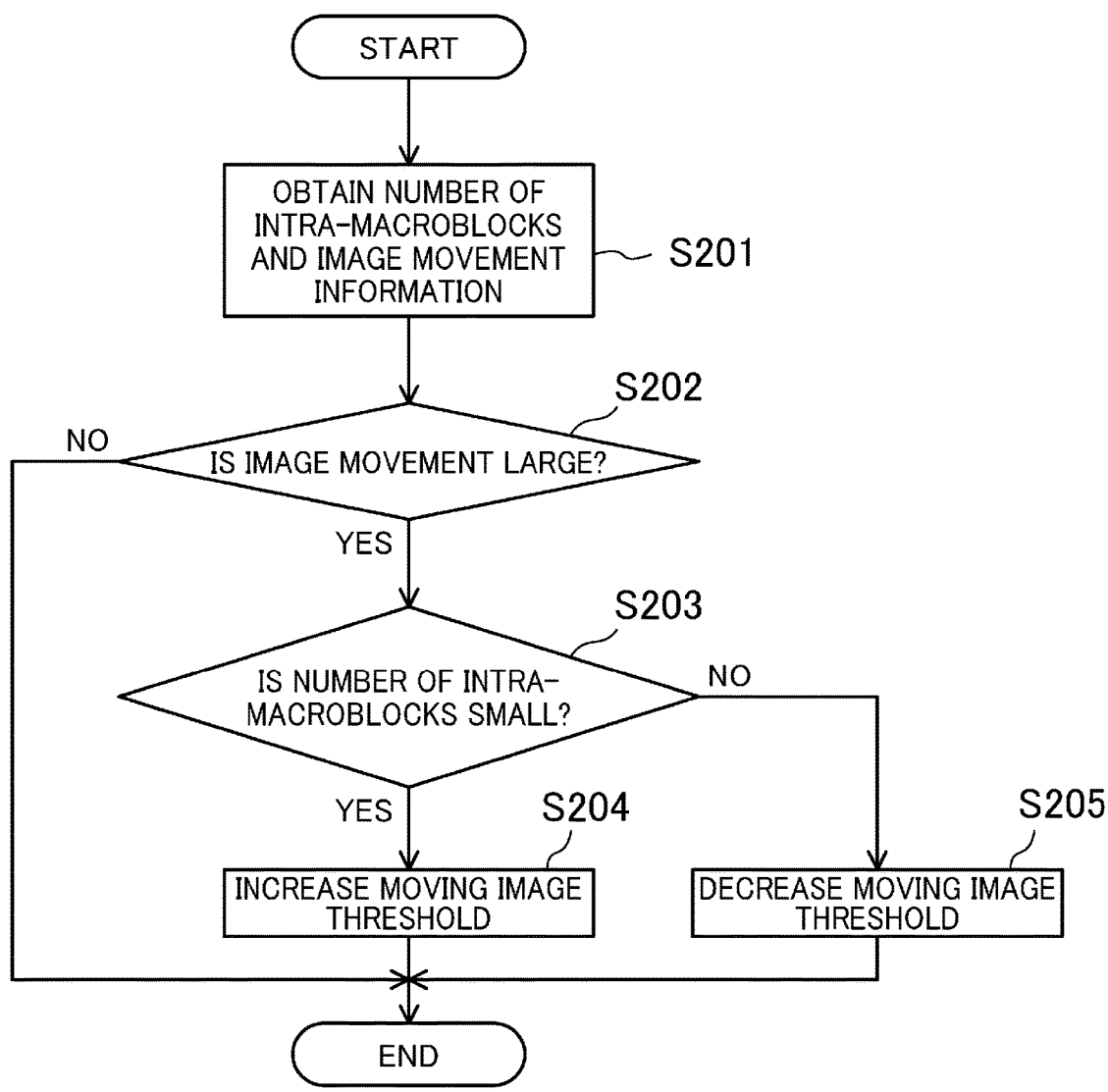
FIG. 9 is a flowchart of a threshold correction algorithm employing the number of intra-macroblocks in a threshold correction unit shown in FIG. 1.

Firstly, a moving image threshold correction control algorithm which employs the number of intra-macroblocks will be described with reference to FIG. 9. In S201, the number of intra-macroblocks obtained when encoding is performed is obtained from the encoder 110, and the image movement information obtained when encoding is performed is obtained from the encoding determination unit 111. In S202, in the threshold correction unit 112, if the obtained image movement information is small, it is determined that the motion is small and therefore it is not necessary to correct the moving image threshold, and therefore, the threshold is not to be corrected. If the image movement information is large, it is determined that it is likely that the scene has a large motion. In this case, in S203, it is determined how the threshold is to be corrected based on the number of intra-macroblocks. In other words, it is determined that "intra-macroblocks occur=a motion is large," and therefore, the threshold is to be corrected. Specifically, if it is determined that the number of intra-macroblocks is small, it is determined that the scene does not have a large motion, and therefore, the moving image threshold is increased so that the frame skipping determination is stricter (S204). If it is determined that the number of intra-macroblocks is large, it is determined that the scene has a large motion, and therefore, the moving image threshold is decreased so that the frame skipping determination is less strict (S205).

Next, a process of using a motion vector value in a frame which is output as a threshold correction parameter by the encoder 110 will be described with reference to FIG. 10. In S301, the motion vector value obtained when encoding is performed is obtained from the encoder 110, and the image movement information obtained when encoding is performed is obtained from the encoding determination unit 111. In S302, in the threshold correction unit 112, if the obtained image movement information is small, it is determined that the motion is small and therefore it is not necessary to correct the moving image threshold, and therefore, the threshold is not to be corrected. If the image movement information is large, it is determined that it is likely that the scene has a large motion. In this case, in S303, it is determined how the threshold is to be corrected based on the motion vector value. In other words, because the motion vector value indicates the amount of a movement of a macroblock between the encoded frame and the reference frame, it is determined that "the motion vector value is large=the motion is large." If it is determined that the motion vector value is large, it is determined that the scene has a large motion, and therefore, the moving image threshold is decreased so that the frame skipping determination is less strict. If it is determined that the motion vector value is small, it is determined that the scene does not have a large motion, and therefore, the moving image threshold is increased so that the frame skipping determination is stricter (S305).

Next, a process of using the number of bits allocated for encoding and a quantization parameter value (QP value) in a frame which are output as threshold correction parameters by the encoder 110 will be described with reference to FIG. 11. In S401, the number of bits allocated for encoding and the QP value obtained when encoding is performed are obtained from the encoder 110, the image movement information obtained when encoding is performed is obtained from the encoding determination unit 111. In S402, in the threshold correction unit 112, if the obtained image movement information is large, it is determined that the motion is large and therefore it is not necessary to correct the still image threshold, and therefore, the threshold is not to be corrected. If the image movement information is small, it is determined that it is likely that the scene has a small motion, and it is determined how the threshold is to be corrected based on the number of bits allocated for encoding and the QP value (S403, S404, and S406).

Initially, if the number of bits allocated for encoding and the QP value are small, the encoding efficiency is high, and therefore, it is determined that the number of bits allocated for encoding per frame is not affected even when encoding is performed, and the threshold is to be corrected. Specifically, if it is determined in S403 that the number of bits allocated for encoding is small, it is determined in S404 whether the QP value is large or small. If it is determined in S404 that the QP value is small, the frame is determined to have a high encoding efficiency, in S405 the still image threshold is decreased so that the frame skipping determination is stricter. If it is determined in S404 that the QP value is large, the number of bits allocated for encoding is small because the compression efficiency is high, but not because the encoding efficiency is high, and therefore, the still image threshold is not to be corrected.

On the other hand, if it is determined in S403 that the number of bits allocated for encoding is large, it is determined in S406 whether the QP value is large or small. If it is determined in S406 that the QP value is small, the number of bits allocated for encoding is large because the compression efficiency is low, and therefore, the still image threshold is not to be corrected. If it is determined in S406 that the QP value is large, it is determined that the frame has a low compression efficiency, and therefore, in S407 the still image threshold is increased.

Next, the skip process of the frame skipping controller 113 will be described with reference to FIGS. 12 and 13.

There are two frame skipping processes. FIG. 12 shows a simple frame decimation technique. If it is determined that encoding is not to be performed on a frame 601, encoding is not performed on the frame 601, and the frame 601 is discarded to decrease the frame rate.

In some stream standards or products, however, the frame rate is defined as being constant. In this case, a dummy frame may be inserted as shown in FIG. 13. As can be seen from FIG. 13, if it is determined that encoding is not to be performed on a frame 701, the frame 701 is discarded and replaced with a dummy frame 702. The dummy frame 702 includes only skipped macroblocks, i.e., only encoded information indicating that the frame is similar to a reference frame, and therefore, includes only a considerably small amount of information. Therefore, even if the dummy frame 702 is inserted instead of the discarded frame 701, the number of bits allocated for encoding per frame is little affected.

Next, a picture type for which the encoding determination process is performed by the encoding determination unit 111 will be described. The encoding determination unit 111 does not perform the encoding determination process for all frames, but does so, taking into consideration a picture type used when encoding is performed.

If the frame of a P picture 801 which is a reference frame for a P picture 802 of FIG. 14A is skipped, in the P picture 802 the frame of an I picture 803 which is the second previous frame from the P picture 802 needs to be referenced. In this case, the difference in time is large, the difference between the frames is also large, resulting in an increase in the number of bits allocated for encoding.

However, even if a frame which is not referenced (e.g., a B picture 804 shown in FIG. 14B) is skipped, the relationship of the succeeding reference frames is not changed, and therefore, the number of bits allocated for encoding does not increase. Therefore, a better frame skipping process can be performed by performing the encoding determination process, depending on the picture type.

Figure 15A:
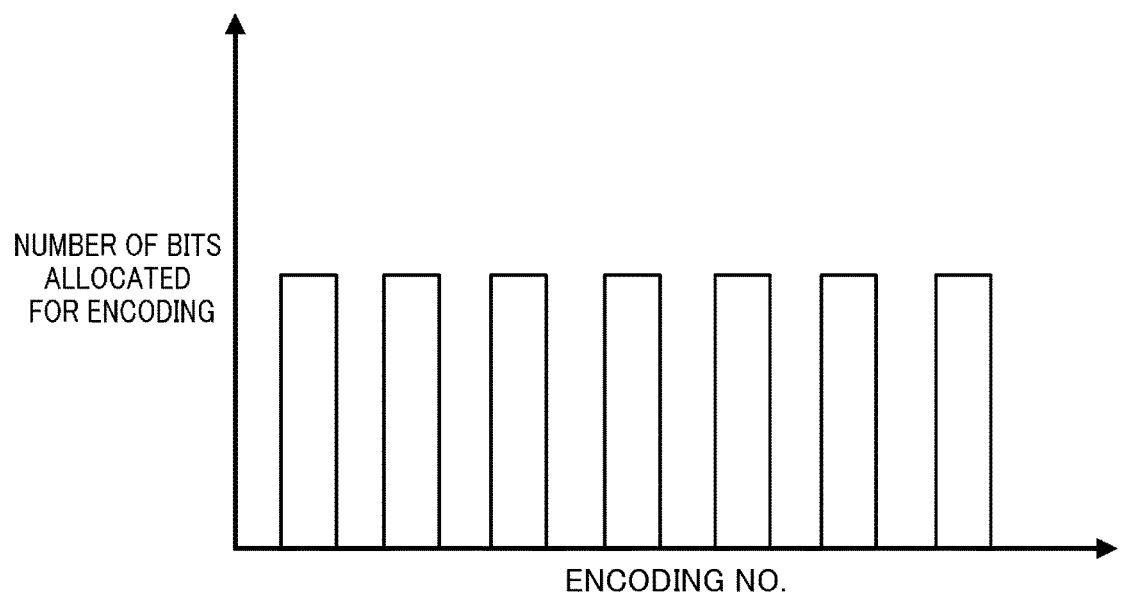
FIGS. 15A and 15B are diagrams for describing initial settings of an encoding determination threshold in the encoding determination unit of FIG. 1.
Figure 15B:
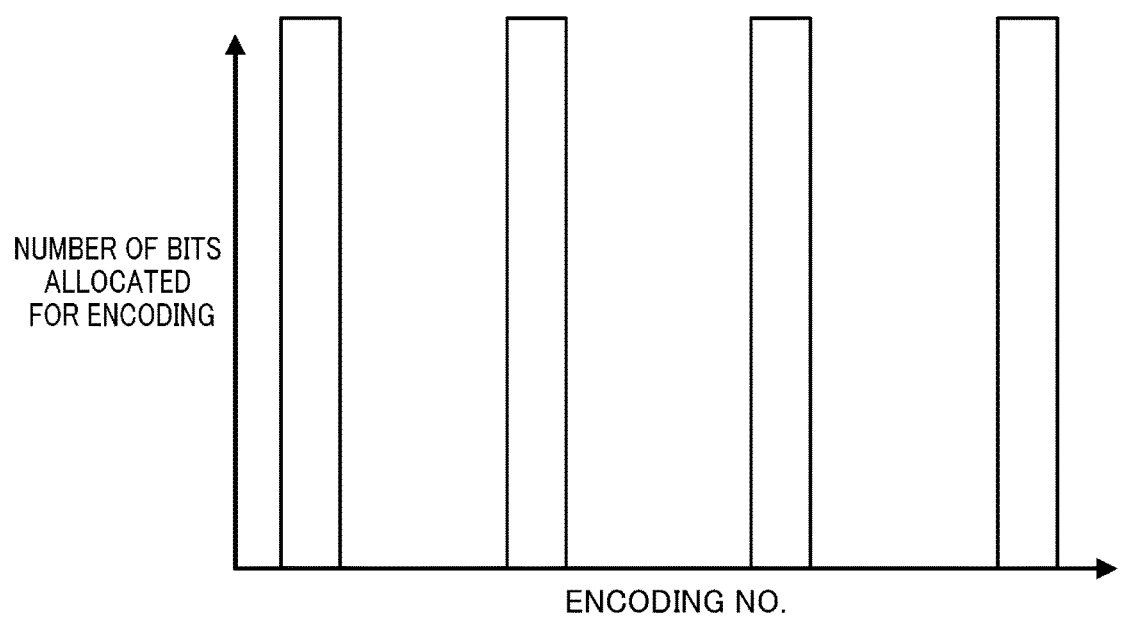

The threshold needs to be changed, depending on the bit rate or the frame rate. FIGS. 15A and 15B show allocation of different numbers of bits to streams having the same bit rate and different frame rates. Compared to FIG. 15B, in FIG. 15A the number of bits allocated for encoding per frame is small, and therefore, in order to increase the number of bits allocated for encoding, the still image threshold and the moving image threshold need to be set to be higher and lower, respectively, so that more frames are to be skipped.

In the encoding determination process, if the encoding determination is performed every frame or every specific picture type, it is likely that the frame rate is not constant, resulting in an unnatural image. In particular, if an excessive number of frames are skipped in a scene having a large motion, a significantly unnatural image is generated. Therefore, as shown in FIG. 16, when it is determined that a frame 901 is to be skipped, control proceeds to the dummy replacement mode, in which some of that frame and a plurality of succeeding frames are skipped at a rate of one per predetermined number of frames (i.e., a frame is skipped at predetermined intervals). In this case, the frame rate can be maintained at specific intervals.

Figure 17:
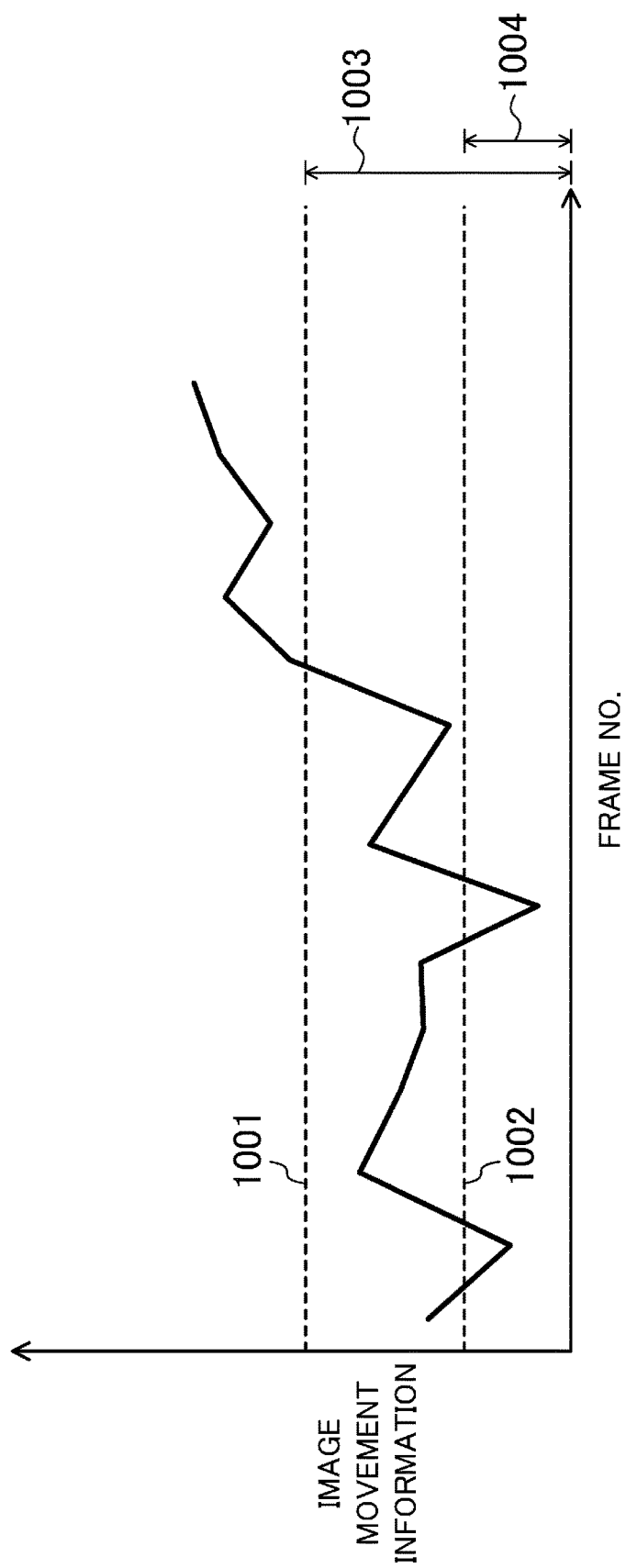
FIG. 17 is a diagram for describing a multi-threshold control algorithm in the encoding determination unit of FIG. 1.

However, if the above process is performed, the frame skipping rate is fixed and the frame rate cannot be further decreased. Therefore, a plurality of moving image thresholds and a plurality of still image thresholds may be provided. In an example shown in FIG. 17, an upper still image threshold 1001 is provided, and frame skipping is performed within a range 1003 so that the frame rate is reduced by a factor of two. A lower still image threshold 1002 is provided, and frame skipping is performed within a range 1004 so that the frame rate is reduced by a factor of four. Thus, by changing the skipping rate, depending on the value of the image movement information, the frame rate is dynamically changed at specific intervals.

Figure 18:
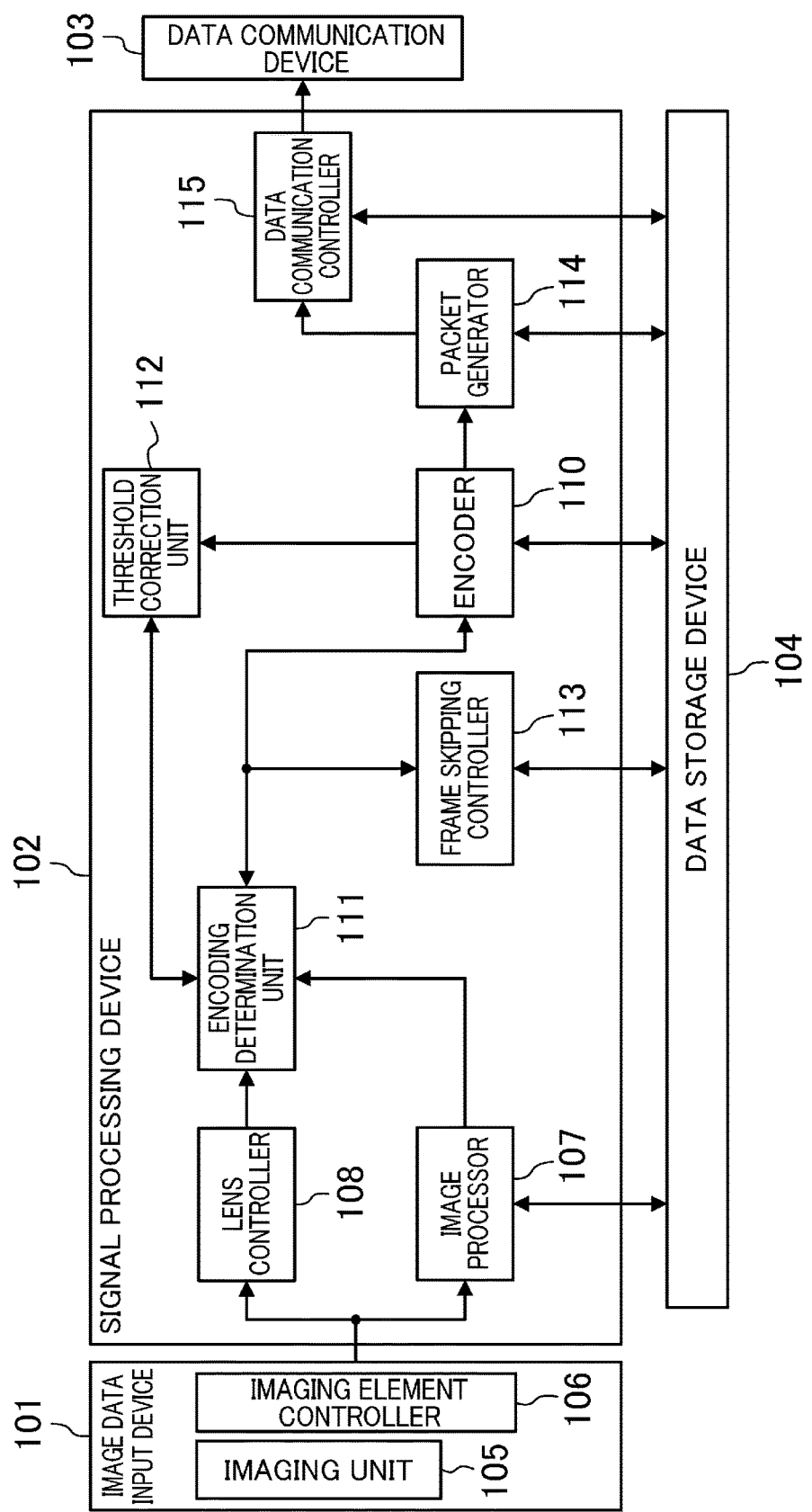
FIG. 18 is a block diagram of a variation of FIG. 1.

The encoding determination process may also be achieved by employing information about the encoding result as the image movement information. As shown in FIG. 18, information about frames to be encoded may not be previously obtained, in order to facilitate the process and reduce the circuit size. In this case, the encoding result is used as the image movement information of the next frame to perform the skipping determination process. Note that there is a one-frame time lag between information for the encoding determination and a frame in which the encoding determination is performed, the accuracy of the encoding determination process is degraded.

In the signal processing device and the moving image capturing device of the present disclosure, the encoding determination is performed based on the representative point matching information or the angular velocity sensor information before encoding is performed, and the encoding determination threshold is dynamically changed based on the encoding result. As a result, the frame skipping determination process suited to each scene can be performed, whereby the number of bits allocated for encoding per frame can be increased, and encoding can be performed without unnaturalness in terms of visual perception and image quality. Therefore, the present disclosure is useful for a signal processing device and a moving image capturing device.

What is claimed is:

1. A signal processing device for compressing image data of a plurality of frames to generate a stream, comprising:
an encoder configured to encode input image data;
an image processor configured to obtain spatial frequency information of an image within one frame of the image data and to obtain image movement information indicating an amount of a movement of a same image between two frames;
an encoding determination unit configured to compare the image movement information with an encoding determination threshold, thereby determining whether or not encoding is to be performed, wherein the encoding determination unit determines whether or not encoding is to be performed, after temporarily changing the encoding determination threshold so as to cause a frame skipping control if encoding is not to be performed to be less strict when the spatial frequency information of an image within one frame indicates a high spatial frequency, or without changing the encoding determination threshold when the spatial frequency information of an image within one frame indicates a low spatial frequency;
a frame skipping controller configured to perform a frame skipping control when the encoding determination unit determines that encoding is not to be performed; and
a threshold correction unit configured to correct the encoding determination threshold of the encoding determination unit,
wherein the encoder selectively performs the encoding in accordance with a result of determination obtained by the encoding determination unit, and the threshold correction unit corrects the encoding determination threshold of the encoding determination unit based on the number of bits allocated for encoding and a quantization parameter value in a frame encoded by the encoder, or a motion vector value or the number of intra-macroblocks in a frame encoded by the encoder.

2. The signal processing device of claim 1, further comprising:
a pixel movement calculation unit,
wherein the image movement information used in the encoding determination unit is pixel movement information obtained by a representative point matching scheme performed by the pixel movement calculation unit.

3. The signal processing device of claim 1, further comprising:
a lens controller,
wherein the image movement information used in the encoding determination unit is angular velocity sensor information obtained from the lens controller.

4. The signal processing device of claim 1, further comprising:
at least one of a pixel movement calculation unit and a lens controller,
wherein the image movement information is a combination of at least one of pixel movement information obtained by a representative point matching scheme performed by the pixel movement calculation unit and angular velocity sensor information obtained from the lens controller, and the spatial frequency information obtained from the image processor.

5. The signal processing device of claim 1, wherein the encoding determination unit has a still image threshold as the encoding determination threshold, and determines that encoding is not to be performed on a frame which is lower than the still image threshold.

6. The signal processing device of claim 1, wherein the encoding determination unit has a moving image threshold as the encoding determination threshold, and determines that encoding is not to be performed on a frame which is higher than the moving image threshold.

7. The signal processing device of claim 1, wherein the encoding determination unit has a still image threshold and a moving image threshold as the encoding determination threshold, and determines that encoding is not to be performed on a frame which is lower than the still image threshold and a frame which is higher than the moving image threshold.

8. The signal processing device of claim 1, wherein
when the encoding determination unit determines that encoding is not to be performed, the encoder does not perform encoding, and the frame skipping controller inserts a dummy frame including only skipped macroblocks.

9. The signal processing device of claim 1, wherein
the encoding determination unit performed an encoding determination process based on a picture type of the stream at a time of encoding determination.

10. The signal processing device of claim 1, wherein
the encoding determination threshold used in the encoding determination unit is changed based on a bit rate, a frame rate, or an image resolution of the stream to be generated.

11. The signal processing device of claim 1, wherein
when the encoding determination unit determines that a motion is small or that a motion is large, frame skipping is performed at predetermined intervals for a first frame for which the determination is performed and a plurality of frames succeeding the first frame.

12. The signal processing device of claim 1, wherein
the encoding determination unit has a plurality of encoding determination thresholds so that the number of frames which are to be continuously skipped is changed.

13. The signal processing device of claim 1, wherein
the encoding determination unit determines whether or not encoding is to be performed, by using, instead of the image movement information, any of the number of intra-macroblocks in a frame obtained from the encoder, the motion vector value in a frame obtained from the encoder, and the number of bits allocated for encoding and a quantization parameter value obtained from the encoder.

* * * * *